(12) United States Patent
Xu

(10) Patent No.: US 9,114,821 B1
(45) Date of Patent: Aug. 25, 2015

(54) MULTI-FUNCTION BABY STROLLER

(71) Applicant: ZheJiang JinBang Sports Equipment Co., Ltd., Lishui, Zhejiang (CN)

(72) Inventor: Yongqiang Xu, Zhejiang (CN)

(73) Assignee: Zhejiang JinBang Sports Equipment Co., Ltd. (CN)

( * ) Notice: Subject to any disclaimer, the term of this patent is extended or adjusted under 35 U.S.C. 154(b) by 0 days.

(21) Appl. No.: 14/557,438

(22) Filed: Dec. 1, 2014

(30) Foreign Application Priority Data

Jul. 11, 2014 (CN) ...................... 2014 2 0382010 U

(51) Int. Cl.
*A63C 17/00* (2006.01)
*B62B 7/14* (2006.01)

(52) U.S. Cl.
CPC ..................................... *B62B 7/142* (2013.01)

(58) Field of Classification Search
CPC ............ B62K 9/02; B62K 9/00; B62K 3/002; B62K 13/00; B62K 13/08; B62K 5/02; B62K 5/06; B62K 13/04; B62B 7/142
See application file for complete search history.

(56) References Cited

U.S. PATENT DOCUMENTS

| | | | | |
|---|---|---|---|---|
| 1,282,433 A * | 10/1918 | Kinnard | ....................... | 280/7.17 |
| 1,347,384 A * | 7/1920 | Kinnard | ....................... | 280/7.1 |
| 1,444,295 A * | 2/1923 | Wynne | ........................... | 280/7.1 |
| 1,838,877 A * | 12/1931 | Stevens | .......................... | 280/7.1 |
| 2,798,727 A * | 7/1957 | Jensen et al. | ................. | 280/7.17 |
| 3,352,570 A * | 11/1967 | Cordrey | ........................ | 280/282 |
| 4,079,957 A * | 3/1978 | Blease | ........................... | 280/278 |
| 4,162,797 A * | 7/1979 | McBride | ....................... | 280/275 |
| 4,274,647 A * | 6/1981 | Drake, Jr. | .................. | 280/87.042 |
| 4,546,991 A * | 10/1985 | Allen et al. | ................... | 280/282 |
| 4,657,270 A * | 4/1987 | Allen et al. | ................... | 280/7.1 |
| 4,691,930 A * | 9/1987 | Samuel | ......................... | 280/7.1 |
| 4,828,284 A * | 5/1989 | Sandgren | ..................... | 280/221 |
| 4,863,182 A * | 9/1989 | Chern | .......................... | 280/266 |
| 4,895,379 A * | 1/1990 | Kelly | .............................. | 280/7.1 |
| 4,958,842 A * | 9/1990 | Chang | ........................... | 280/7.1 |
| 6,089,586 A * | 7/2000 | Rudell et al. | .................. | 280/282 |
| 6,161,847 A * | 12/2000 | Howell et al. | .................. | 280/30 |
| 6,581,949 B2 * | 6/2003 | Lopez | ........................... | 280/278 |
| 6,619,679 B2 * | 9/2003 | Lan | ............................. | 280/87.05 |
| 6,666,470 B2 * | 12/2003 | Li | ................................. | 280/282 |
| 6,685,207 B1 * | 2/2004 | Blake | ........................... | 280/282 |
| 6,832,774 B1 * | 12/2004 | Zaccagnini | ................... | 280/274 |
| 7,055,841 B2 * | 6/2006 | Buhrman | ...................... | 280/263 |
| D524,699 S * | 7/2006 | Kurth et al. | .................. | D12/112 |
| 7,188,849 B2 * | 3/2007 | Lee | .......................... | 280/87.021 |
| 7,455,308 B2 * | 11/2008 | Michelau et al. | ............. | 280/282 |
| 7,487,982 B2 * | 2/2009 | Chan | .......................... | 280/87.01 |
| 7,540,517 B2 * | 6/2009 | Wernli | ......................... | 280/278 |
| D630,158 S * | 1/2011 | Jessie, Jr. | ..................... | D12/423 |
| D631,102 S * | 1/2011 | Jessie, Jr. | ..................... | D21/424 |
| 7,992,889 B2 * | 8/2011 | Ehrenreich et al. | ........... | 280/648 |
| 8,262,114 B2 * | 9/2012 | Jessie, Jr. | ..................... | 280/279 |
| 8,500,134 B2 * | 8/2013 | Tzoreff | ......................... | 280/7.1 |
| 2002/0070519 A1 * | 6/2002 | Rappaport | .............. | 280/87.041 |
| 2003/0029652 A1 * | 2/2003 | Lan | ............................... | 180/65.2 |

(Continued)

*Primary Examiner* — Hau Phan
*Assistant Examiner* — Jacob Meyer

(57) ABSTRACT

A multi-function baby stroller comprising a headstock tube component, which further comprising a front wheel, a handle and a headstock tube; a frame plate; and a frame tube component further comprising a rear wheel and a frame tube; wherein the headstock tube component and the frame plate are fixed by a broaching positioning device, the frame plate and frame tube component are removably connected.

8 Claims, 6 Drawing Sheets

(56) References Cited

U.S. PATENT DOCUMENTS

| | | |
|---|---|---|
| 2003/0030242 A1* | 2/2003 | Lopez .................. 280/226.1 |
| 2006/0082097 A1* | 4/2006 | Michelau et al. ............ 280/282 |
| 2007/0152422 A1* | 7/2007 | Lin .............................. 280/275 |
| 2010/0148460 A1* | 6/2010 | Nelson et al. ............ 280/87.021 |
| 2010/0283220 A1* | 11/2010 | Tzoreff ..................... 280/281.1 |
| 2011/0057484 A1* | 3/2011 | Staudinger et al. ........... 297/134 |
| 2011/0290065 A1* | 12/2011 | Ehrenreich et al. .......... 74/502.6 |
| 2012/0235385 A1* | 9/2012 | Simpson et al. .............. 280/647 |

\* cited by examiner

MULTI-FUNCTION BABY STROLLER

CROSS-REFERENCE TO RELATED APPLICATIONS

The present application claims priority based on Chinese Application No. 201420382010.1 filed Jul. 11, 2014, the disclosure of which is hereby incorporated by reference in its entirety.

TECHNICAL FIELD

The present application relates to a multifunctional baby stroller.

BACKGROUND

There are many walkers and skateboards in the current market. When children want own both a walker and a skateboard at the same time, money has to be spent for each of those toys. Bot toys are bought, it can be difficult for people to carry the walker and the skateboard simultaneously. Additionally, it also takes a lot of storage space to store both the walker and the skateboard.

What is needed is a baby stroller that will function both as a walker and a skateboard.

SUMMARY

The present application is directed to a multifunctional baby stroller.

A multifunctional baby stroller that can comprise a headstock tube component, a frame plate, a frame tube component, a broaching positioning device and a swift switching means, wherein the headstock tube component can comprise a front wheel, a handle and a headstock tube, wherein the frame tube component can comprise a rear wheel and a frame tube, wherein the headstock tube component and the frame plate are fixed through a broaching positioning device, wherein the frame plate and frame tube component are moveably connected by a swift switching means.

An upper location hole, a lower location hole, an upper location ring and a lower location ring are located on the headstock tube, wherein the upper location hole and the lower location hole are located at a same axis and keep a certain distance. The sleeve is located at the front end of the frame plate. The sleeve is sheathed on the headstock tube. The groove is located on the sleeve and the counter bore is located on the groove. The distance of the counter bore to the top of the sleeve is same to the distance of the upper location hole to the upper location ring. The distance of the counter bore to the bottom of the sleeve is same to the distance of the lower location hole to the lower location ring.

The broaching component comprises a broaching rod, a broaching block, a broaching spring and a broaching handle. The broaching block is fixed on the sleeve. There is a hole on the broaching block. The shape of the broaching rod is a cylinder. The central cylinder is smaller than the both ends of the cylinder. The end of the broaching rod matches with the hole of the broaching block. The other end of the broaching rod matches with the location hole of the headstock tube and the counter bore of the sleeve. The broaching spring is sheathed in the broaching rod and it is located between broaching rod and broaching block. The broaching rod is fixed connection with the broaching handle.

The frame plate comprises a frame plate body and a side panels which are located on the side of the frame plate body. The side panel is equipped with a spindle hole. The frame tube comprises a slender tube and a tubular column which is located at the end of the slender tube. The slender tube is perpendicular to the tubular column. The two underside of the tubular column are equipped with another spindle hole. The circumference surface of the tubular column is equipped with an opening. The slender tube is equipped with a long limit hole.

The swift switching means comprises a button, a tension spring, a bracket, a fast disassembly screw arbor, a fast disassembly screw nut, a double lock screw arbor and double lock screw nut. The double lock screw arbor matches with a spindle hole which is located at side panels and another spindle hole which is located at tubular column. The double lock screw arbor is equipped with double lock screw nut by a threaded connection. The long limit hole is located at the button. The distance of the long limit hole to the right end face of the button is same to the distance of the spindle hole on the tubular column to the long limit hole of the slender tube. The double lock screw arbor goes through the long limit hole on the button. The button is insert into the hole of the circumference surface of the tubular column. The inside of the button is equipped with the tension spring. The bracket is fixed connection with the frame plate body. A U shaped hole is located on the both sides of the bracket. The fast disassembly screw goes through the U shaped hole and the long limit hole of the slender tube. The fast disassembly screw arbor connects with the fast disassembly screw nut by threaded connection.

The swift switching means comprises a plastic bearing. The plastic bearing matches with the double block screw arbor. The plastic bearing locates between the underside of the tubular and the side panel.

It is to be understood that both the foregoing general description and the following detailed description are exemplary only and are not necessarily restrictive of the disclosure as claimed. The accompanying drawings, which are incorporated in and constitute a part of the specification, illustrate an embodiment of the disclosure and together with the general description, serve to explain the principle of the disclosure.

BRIEF DESCRIPTION OF THE DRAWINGS

Further features and advantages of the present device, as well as the structure and operation of various embodiments of the present device, will become apparent and more readily appreciated from the following description or the preferred embodiments, taken in conjunction with the accompanying drawing of which.

DETAILED DESCRIPTION

Figure 1:
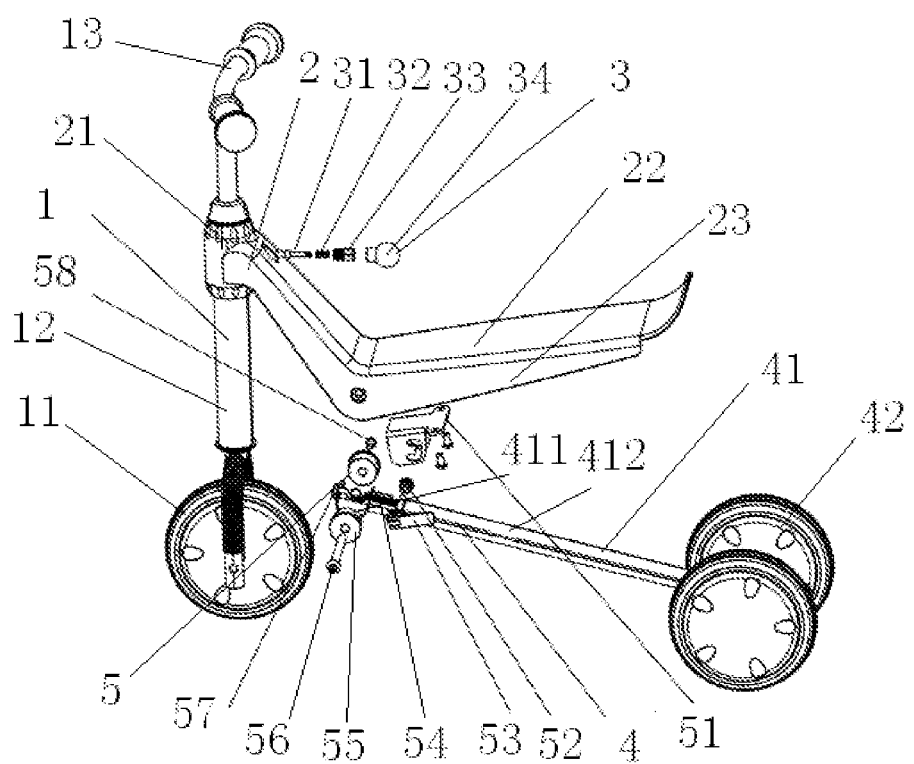
FIG. 1 is an exploded view of a multifunctional baby stroller according to the present application.

In the following detailed description, reference is made to the accompanying drawings that form a part hereof, and in which is shown by way of illustration specific implementations that may be practiced. These implementations are described in sufficient detail to enable those skilled in the art to practice the implementations, and it is to be understood that other implementations may be utilized and that logical, mechanical, electrical and other changes may be made without departing from the scope of the implementation. The following detailed description is, therefore, not to be taken in a limiting sense.

Referring to FIG. 1 to FIG. 7, the present application provides a multifunctional baby stroller that can comprise a headstock tube component 1, a frame plate 2, a frame tube component 4, a broaching positioning device 3 and a swift switching means 5; wherein the frame tube component 4 can comprise a rear wheel 42 and a frame tube 41; wherein the headstock tube component 1 can comprise a front wheel 11, a handle 13 and a headstock tube 12; wherein an upper location hole, a lower location hole, an upper location ring and a lower location ring are located on the headstock tube 12; wherein the upper location hole and the lower location hole are located at a same axis and keep a certain distance from each other; wherein the sleeve 21 is located at the front end of the frame plate 2; wherein the sleeve 21 is sheathed in the headstock tube 12 and fit with each other; wherein a groove is located in the sleeve 21 and a counter bore is located at in the groove; wherein the distance of the counter bore to the top of the sleeve 21 is same to the distance of the upper location hole to the upper location ring; wherein the distance of the counter bore to the bottom of the sleeve 21 is same to the distance of the lower location hole to the lower location ring; wherein the frame plate 2 comprises frame plate body 22 and side panels 23 which are located at the side of the frame plate body 22; wherein the side panel 23 is equipped with spindle hole; wherein the frame tube 41 can comprise a slender tube 412 and tubular column 411 which is located at the end of the slender tube 412; wherein the slender tube 412 is perpendicular to the tubular column 411; wherein the two underside of the tubular column 411 are equipped with spindle holes; wherein the circumference surface of the tubular column 411 is equipped with hole; and wherein the slender tube 412 is equipped with long limit hole.

The broaching component 3 can comprise a broaching rod 31, a broaching block 33, a broaching spring 32 and a broaching handle 34; wherein the broaching block 33 is fixed on the sleeve 21, wherein there is a hole in the broaching block 33, wherein the shape of the broaching rod 31 is cylindrical, wherein middle part of the cylinder is smaller than the both ends of the cylinder, wherein one end of the broaching rod 31 matches with the hole of the broaching block 33, wherein one end of the broaching rod 31 matches with the location hole of the headstock tube 12 and the counter bore of the sleeve 21, wherein the broaching spring 32 is sheathed in the broaching rod 31 and it is located between broaching rod 31 and broaching block 33, and wherein the broaching rod 33 is fixed connected with the broaching handle 34.

The swift switching means 5 can comprise a bracket 51, a fast disassembly screw nut 52, a fast disassembly screw arbor 53, a tension spring 54, a plastic bearing 55, a double lock screw arbor 56, a button 57 and a double lock screw nut 58; wherein the double lock screw arbor 56 corresponds to the spindle hole which located on the side panels 23 and the spindle hole on the tubular column 411; wherein the double lock screw arbor 56 corresponds to the double lock screw nut 58 by a threaded connection; wherein the plastic bearing 55 corresponds to the double block screw arbor 56; wherein the plastic bearings 55 locate between the underside of the tubular column 411 and the side panel 23; wherein the long limit hole is located on the button 57; wherein the distance of the long limit hole to the right end face of the button 57 is same to the distance of the spindle hole in the tubular column 411 to the long limit hole end of the slender tube 412; wherein the double lock screw arbor 56 goes through the long limit hole in the button 57; wherein the button 57 is insert into the hole of the circumference surface of the tubular column 411; wherein the inside of the button 57 is equipped with tension spring 54; wherein the bracket 51 is fixed connection with the frame plate body 22; wherein the U shaped limit hole is located at the both sides of the bracket 51; wherein the fast disassembly screw arbor 53 goes through the U shaped hole and the long limit hole of the slender tube 412; and wherein the fast disassembly screw arbor 53 connects with the fast disassembly screw nut 52 by threaded connection.

Figure 2:
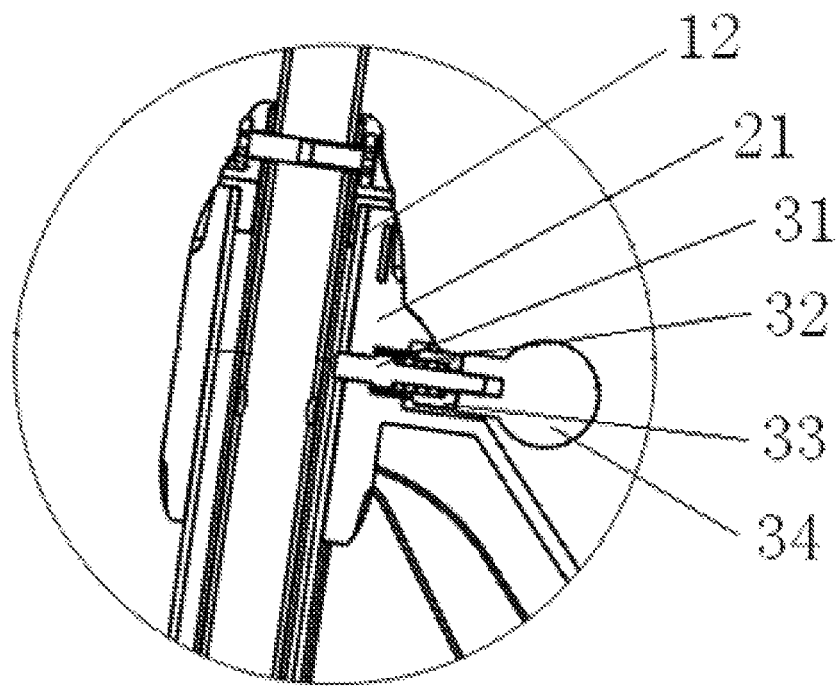
FIG. 2 is the structure schematic drawing of the broaching positioning device according to the present application.
Figure 3:
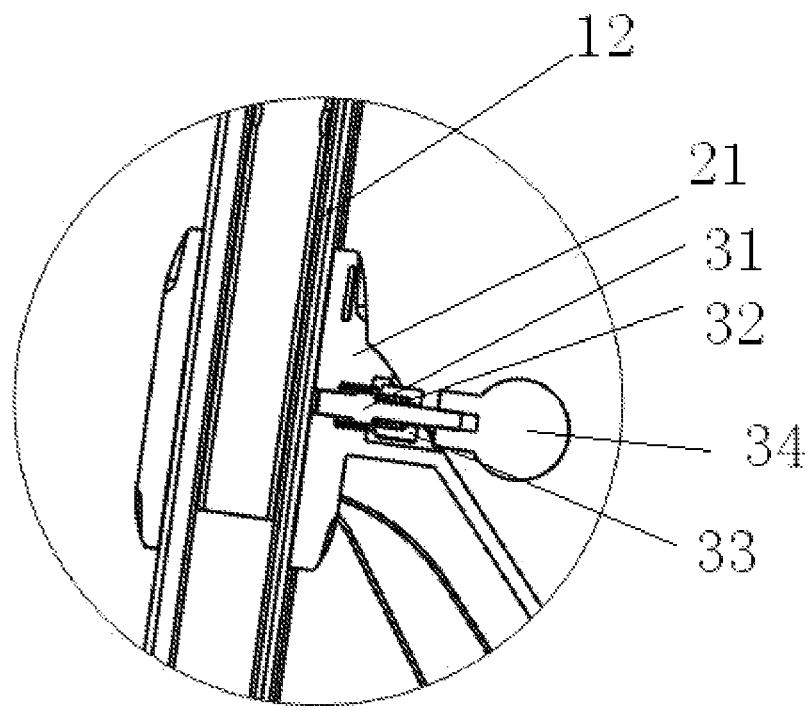
FIG. 3 is the structure schematic drawing of the broaching positioning device according to the present application.
Figure 4:
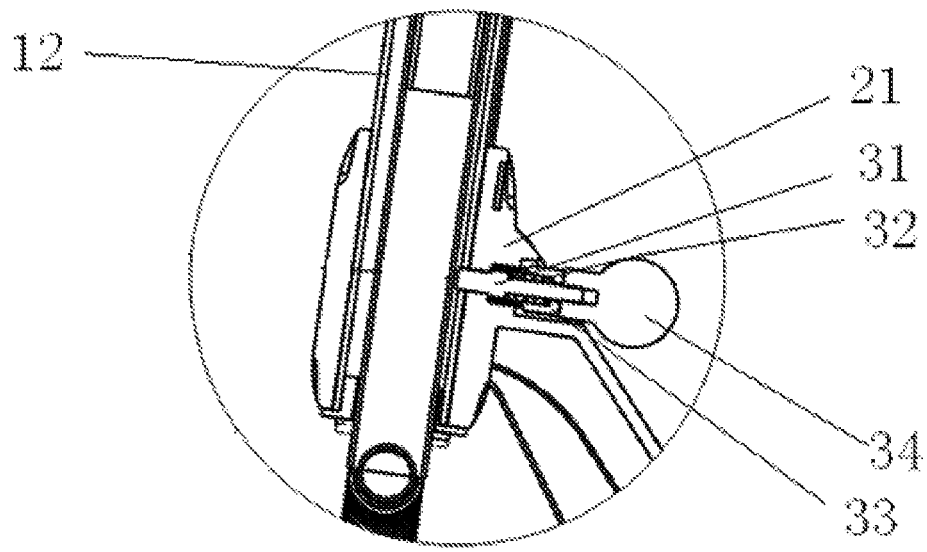
FIG. 4 is the 3rd structure schematic drawing of the broaching positioning device according to the present application.

Referring to FIG. 2 to FIG. 4, by pulling the broaching handle 34 during the period of operation of the broaching positioning device 3, and then the broaching rod 31 recedes. When the broaching rod 31 recedes from the upper location hole, the broaching spring 32 compresses. As a result, the frame plate 2 slides with the respect to the headstock tube component 1. When the underside of the sleeve 21 is in touch with the headstock tube 12, the lower location hole is aligned with the counter bore of the sleeve. With the pressure from the broaching spring 32, the broaching rod 31 is inserted into the lower location hole, and the frame plate 2 is fixedly connected with the headstock tube component 1.

Figure 5:
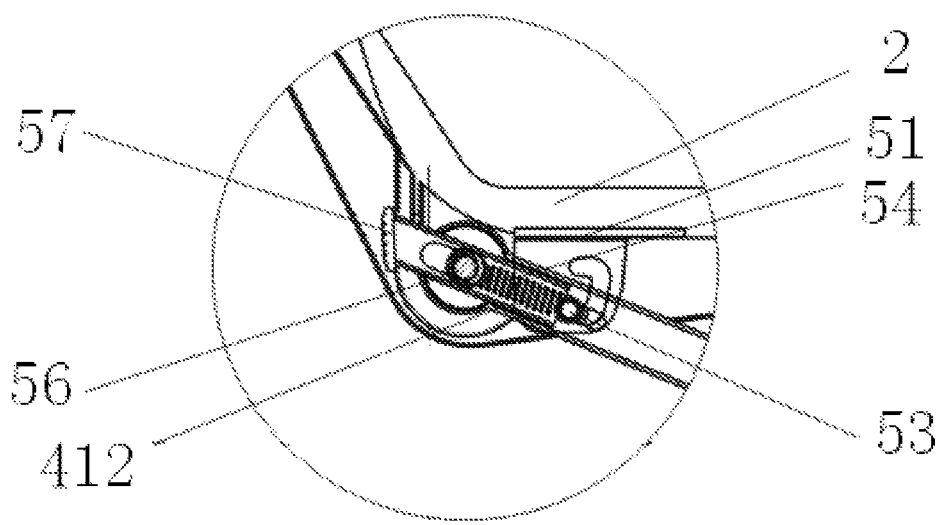
FIG. 5 is the structure schematic drawing of the fast disassembly device according to the present application.
Figure 6:
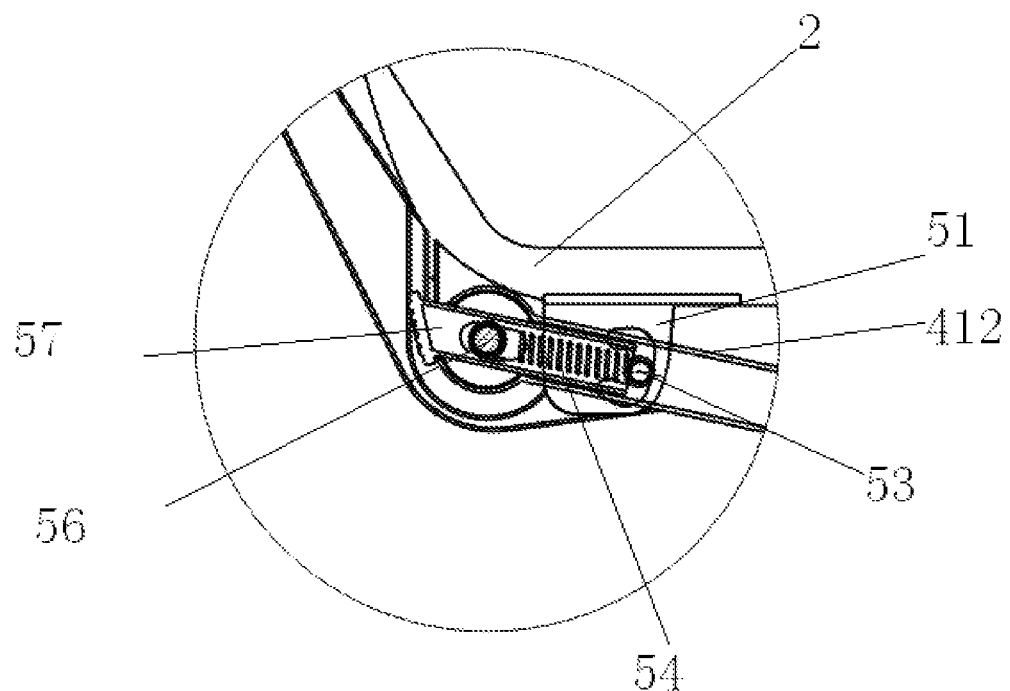
FIG. 6 is the structure schematic drawing of the fast disassembly device according to the present application.
Figure 7:
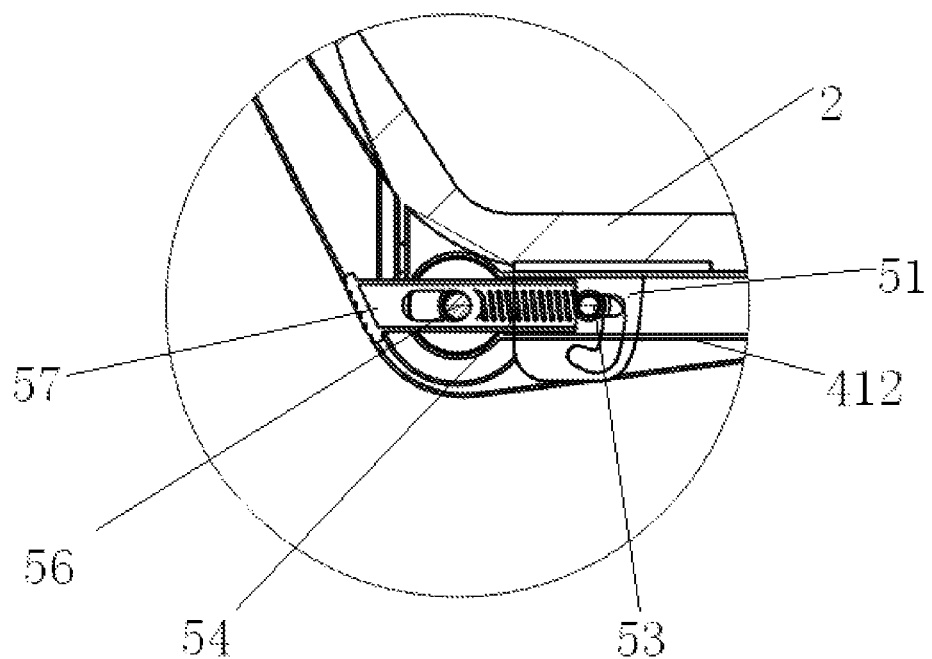
FIG. 7 is the 3rd structure schematic drawing of the fast disassembly device according to the present application.

Referring to FIG. 5 to FIG. 7, by pushing the button 57 during the operation of the swift switching means 5, the button 57 pushes the fast disassembly screw arbor 53. The fast disassembly screw arbor 53 recedes from the U shaped limit hole of the bracket 51. The frame plate 2 turns with the respect to the swift switching means 5. When the frame plate 2 reaches the other limit position, the tension spring 54 pushes back the button 57 to the starting position. And then, the fast disassembly screw arbor 53 enters another position for the purpose of limiting.

Figure 8:
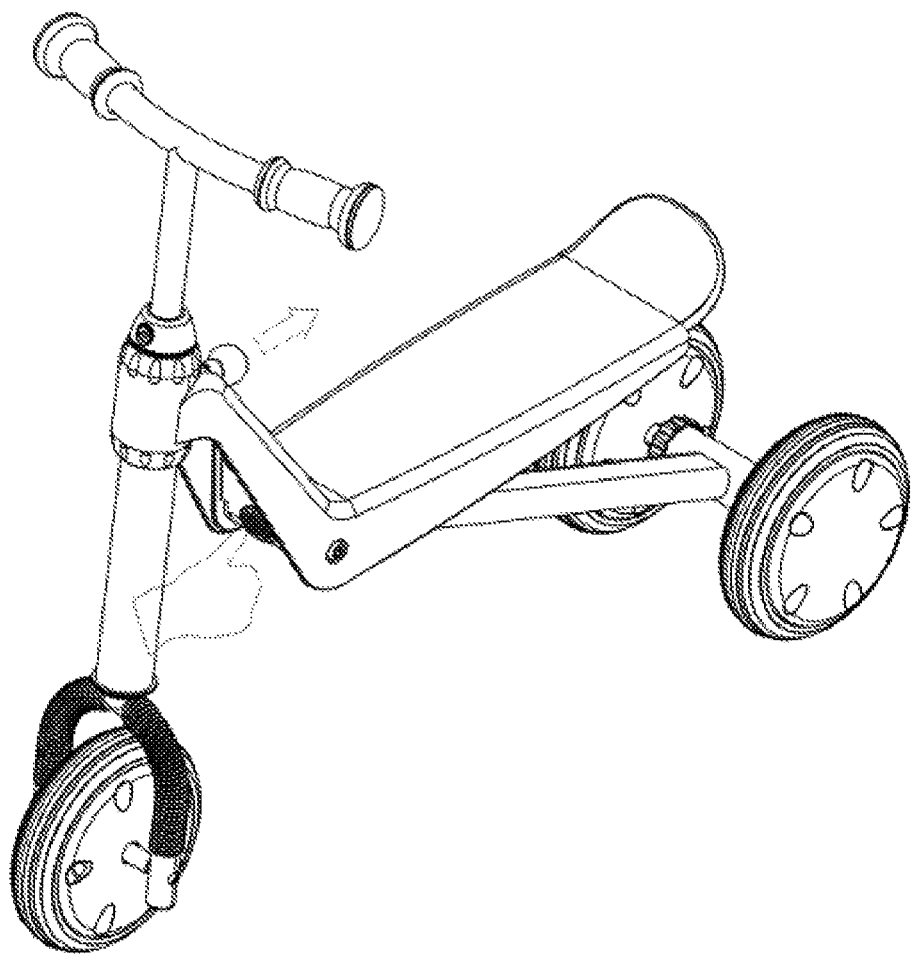
FIG. 8 is the schematic of the multifunctional baby stroller at the state of walker according to the present application.
Figure 9:
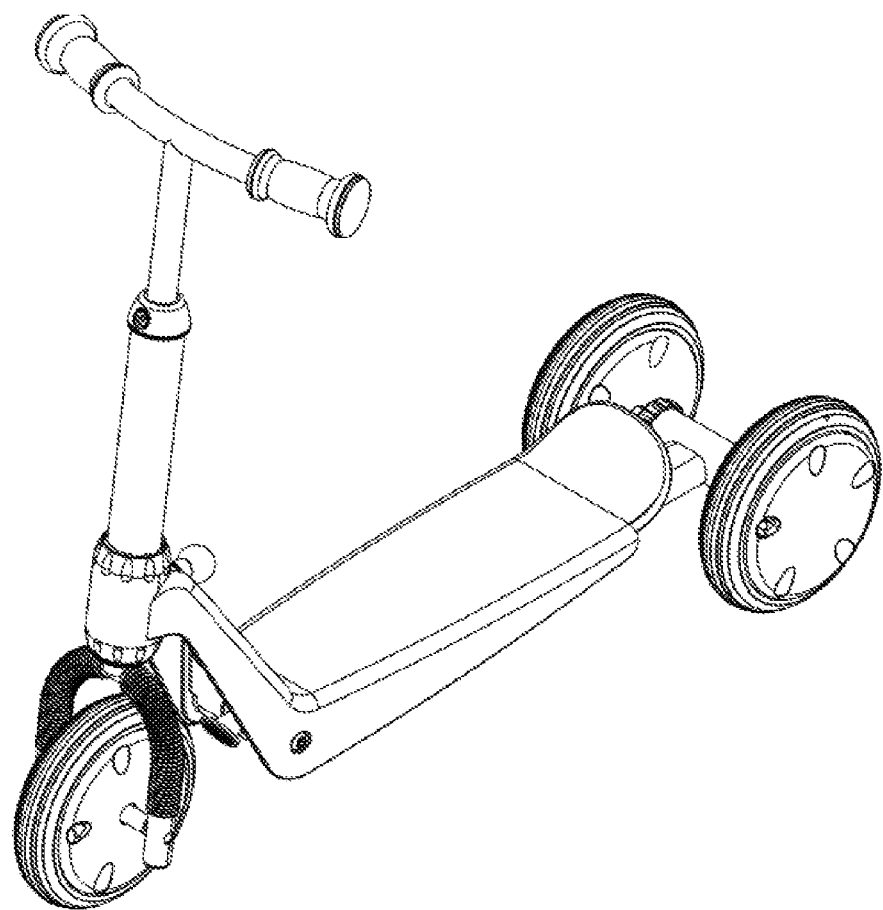
FIG. 9 is the schematic of the multifunctional baby stroller at the state of skateboard according to the present application.

Referring to FIG. 8 to FIG. 9, through the broaching component 3 and the swift switching means 5, the multifunctional baby stroller transforms from the walker to the skateboard.

What is claimed is:

1. A multi-function baby stroller comprising:
   a headstock tube component, further comprising a front wheel, a handle and a headstock tube;
   a frame plate; and
   a frame tube component further comprising a rear wheel and a frame tube;
   wherein the headstock tube component and the frame plate are fixed by a broaching positioning device, the frame plate and frame tube component are removably connected by a swift switching means.

2. The multi-function baby stroller as described in claim 1, wherein the headstock tube further comprises an upper location hole, a lower location hole, an upper location ring and a lower location ring.

3. The multi-function baby stroller as described in claim 2, wherein a sleeve is located at the front end of the frame plate, wherein the sleeve is sheathed on the headstock tube; wherein the sleeve further comprises a groove and the groove further comprises a counter-bore; wherein the distance of the counter bore to the top of the sleeve is the same as the distance of the upper location hole to the upper location ring; wherein the distance of the counter bore to the bottom of the sleeve is the same as the distance of the lower location hole to the lower location ring.

4. The multi-function baby stroller as described in claim 3, wherein the broaching component further comprises a broaching rod, a broaching block, a broaching spring and a broaching handle; wherein the broaching block is fixed on the sleeve; wherein the broaching block further comprises a hole; wherein the shape of the broaching rod is cylindrical and the central part of the cylinder is smaller than the both ends of the cylinder; wherein the end of the broaching rod corresponds with the hole of the broaching block; wherein the other end of the broaching rod corresponds with the location hole of the headstock tube and the counter bore of the sleeve; wherein the broaching spring is sheathed on the broaching rod and it is set between the broaching rod and the broaching block; wherein the broaching rod is fixedly connected with the broaching handle.

5. The multifunctional baby stroller as described in claim 4, wherein the frame plate further comprises a frame plate body and side panels at both sides of the frame plate body; wherein a spindle hole is set on the side panel.

6. The multifunction baby stroller as described in claim 5, wherein the frame tube further comprises a slender tube and a tubular column, wherein the tubular column is located at an end of the slender tube and perpendicular to the slender tube; wherein there is a spindle hole on two undersides of the tubular column; wherein an opening is set on the circumference surface of the tubular column; and wherein a long limit hole is set on the slender tube.

7. The multi-function baby stroller as described in claim 6, wherein the swift switching means further comprises a button, a tension spring, a bracket, a fast disassembly screw arbor, a fast disassembly screw nut, a double lock screw arbor and a double lock screw nut; the double lock screw arbor matches with the spindle hole at the side panels and the spindle hole at the tubular column; the double lock screw arbor is equipped with the double lock screw nut by threaded connection; the long limit hole is located at the button; the distance of the long limit hole to the right end face of the button is same to the distance of the spindle hole on the tubular column to the long limit hole of the slender tube; wherein the double lock screw arbor goes through the long limit hole on the button; wherein the button is inserted into the hole of the circumference surface of the tubular column; wherein the inside of the button is equipped with the tension spring; the bracket is in fixed connection with the frame plate body, wherein a U shaped limit hole is located at the both sides of the bracket; the fast disassembly screw goes through the U shaped limit hole and the long limit hole of the slender tube; and wherein the fast disassembly screw arbor connects with the fast disassembly screw nut by threaded connection.

8. The multi-function baby stroller as described in claim 7, wherein the swift switching means further comprises a plastic bearing which corresponds with the double lock screw arbor, wherein the plastic bearing is set between the underside of the tubular column and the side panel.

\* \* \* \* \*